US008601858B2

(12) United States Patent
Côté et al.

(10) Patent No.: US 8,601,858 B2
(45) Date of Patent: Dec. 10, 2013

(54) METHOD FOR TESTING A MECHANICAL INTEGRITY OF AN INSULATING LAYER COVERING A CONDUCTOR IN A CABLE

(75) Inventors: Jacques Côté, Laval (CA); Paul J. Caronia, Annadale, NJ (US); Janislaw Tarnowski, Montréal (CA); André Gaudreau, Boucherville (CA); Mircea Iordanescu, Brossard (CA); Roger Paquette, Saint-Antoine-sur-Richelieu (CA)

(73) Assignees: Union Carbide Chemicals & Plastics Technology LLC, Midland, MI (US); Hydro-Quebec, Montreal, Quebec (CA)

( * ) Notice: Subject to any disclaimer, the term of this patent is extended or adjusted under 35 U.S.C. 154(b) by 528 days.

(21) Appl. No.: 12/735,067

(22) PCT Filed: Dec. 10, 2008

(86) PCT No.: PCT/CA2008/002150
§ 371 (c)(1),
(2), (4) Date: Oct. 1, 2010

(87) PCT Pub. No.: WO2009/076750
PCT Pub. Date: Jun. 25, 2009

(65) Prior Publication Data
US 2011/0011163 A1   Jan. 20, 2011

Related U.S. Application Data

(60) Provisional application No. 61/006,018, filed on Dec. 14, 2007.

(51) Int. Cl.
*G01M 3/26* (2006.01)

(52) U.S. Cl.
USPC ............................................. 73/40.7; 73/49.2

(58) Field of Classification Search
USPC .................................................. 73/40.7, 49.2
See application file for complete search history.

(56) References Cited

U.S. PATENT DOCUMENTS

| 1,999,771 | A |   | 4/1935 | Mample |
| 4,715,214 | A | * | 12/1987 | Tveter et al. ................... 73/49.2 |
| 5,238,172 | A |   | 8/1993 | Le Davay |
| 5,596,138 | A |   | 1/1997 | Onodera et al. |

(Continued)

FOREIGN PATENT DOCUMENTS

JP   64-013430   1/1989

OTHER PUBLICATIONS

Hamel, et al., "Intermittent Arcing Fault on Underground Low-Voltage Cables", IEEE Transactions on Power Delivery, vol. 19, No. 4, pp. 1862-1868, Oct. 2004.

(Continued)

*Primary Examiner* — Hezron E Williams
*Assistant Examiner* — Gregory J Redmann
(74) *Attorney, Agent, or Firm* — Muirhead and Saturnelli, LLC

(57) ABSTRACT

A method for testing a mechanical integrity of an insulating layer covering a conductor in a cable, a longitudinal void being defined inside the insulating layer in a region of the conductor. A first end of the insulating layer is blocked. A compressed gas is injected at a second end of the insulating layer so that the gas enters and travels the longitudinal void inside the insulating layer towards the first end. A gas pressure inside the insulating layer is measured at least near the second end. Injection of the compressed gas is stropped after a predetermined injection time period. A variation of the gas pressure inside the insulating layer is monitored during a diagnostic time window succeeding to a transitional time period following the stopping of the injection. Integrity of the insulating layer is determined based on the variation of the gas pressure during the diagnostic time window.

18 Claims, 5 Drawing Sheets

(56) References Cited

U.S. PATENT DOCUMENTS 6,600,423 B1  7/2003  Rozier et al.

OTHER PUBLICATIONS

Koch, et al., "Manhole Explosions Due to Arcing Faults on Underground Secondary Distribution Cables in Ducts", IEEE Transactions of Power Delivery, vol. 7, No. 3, pp. 1425-1433, Jul. 1992.

B. Koch, et al., "Manhole Explosions Due to Arcing Faults on Underground Secondary Distribution Cables in Ducts," IEEE Transactions on Power Delivery, 1992, vol. 7, No. 3, pp. 1425-1433.

A. Hamel, et al., "Intermittent Arcing Fault on Underground Low-Voltage Cables," IEEE Transactions on Power Delivery, 2004, vol. 19, No. 4, pp. 1862-1868.

S. Cress, et al., "Detection and Interruption of Arcing Faults on Distribution Utility Secondary Voltage Conductors," CEATI Report No. T044700-5042, 2005, 112 pp.

Y. Wen, et al., "600 V Rated Secondary Cable Survey," IEEE ICC presentation, Fountain•Hills, AZ, Oct. 18, 2010, 21 pp.

J. Tarnowski, et al., "Pneumatic Testing of the Insulation of Low-Voltage Underground Cables," CIGRE 2012, B1-202, 9 pp.

\* cited by examiner

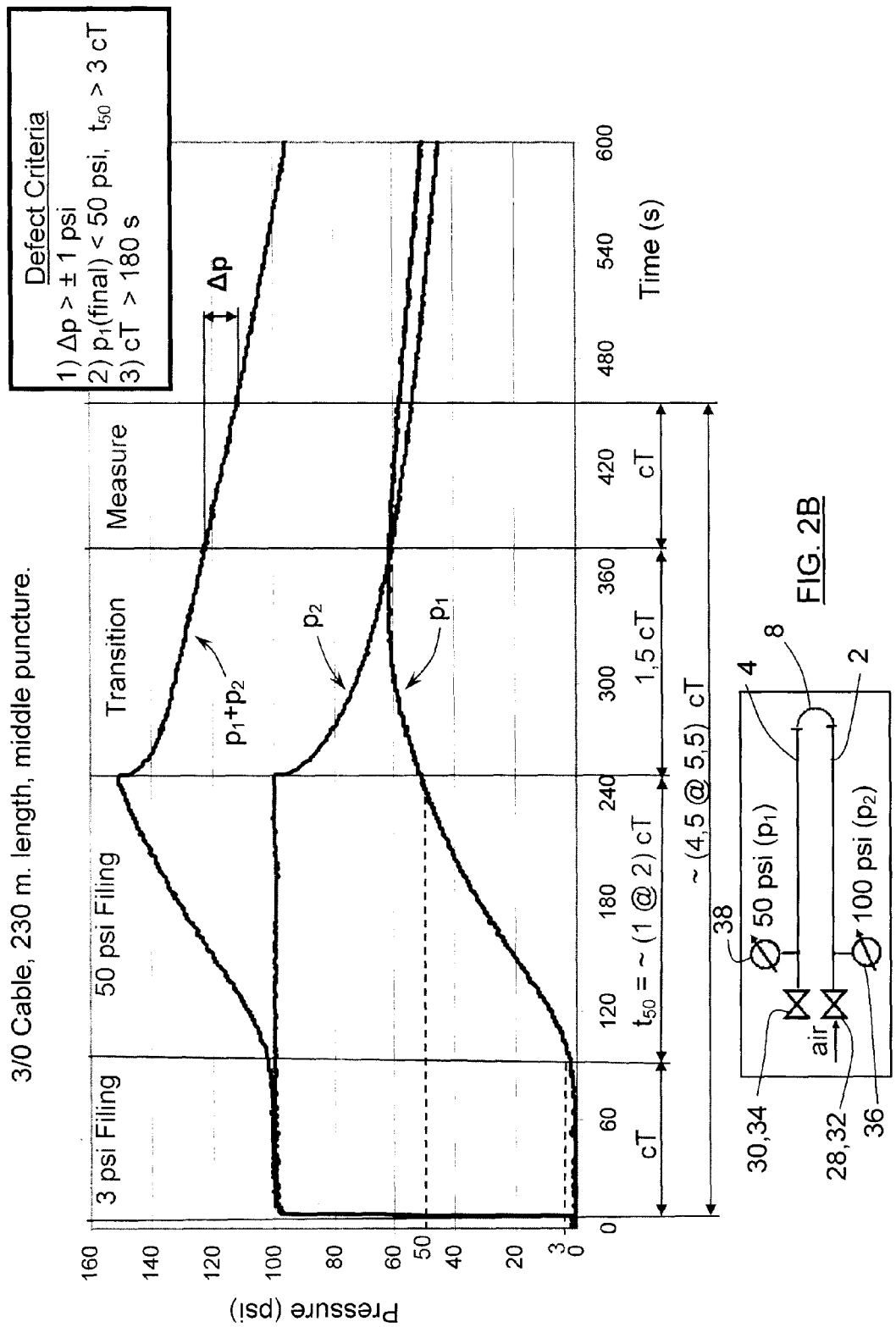

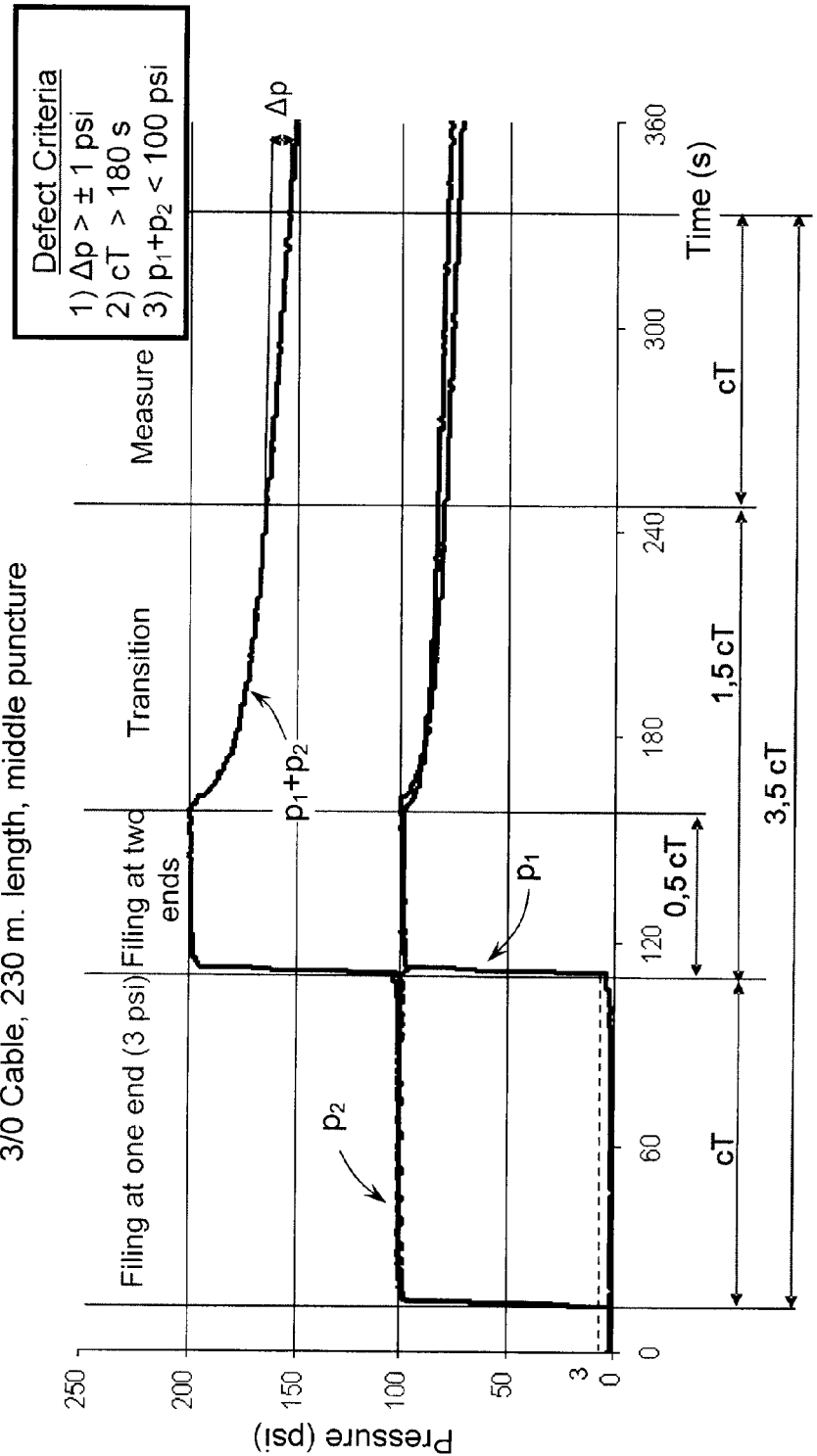

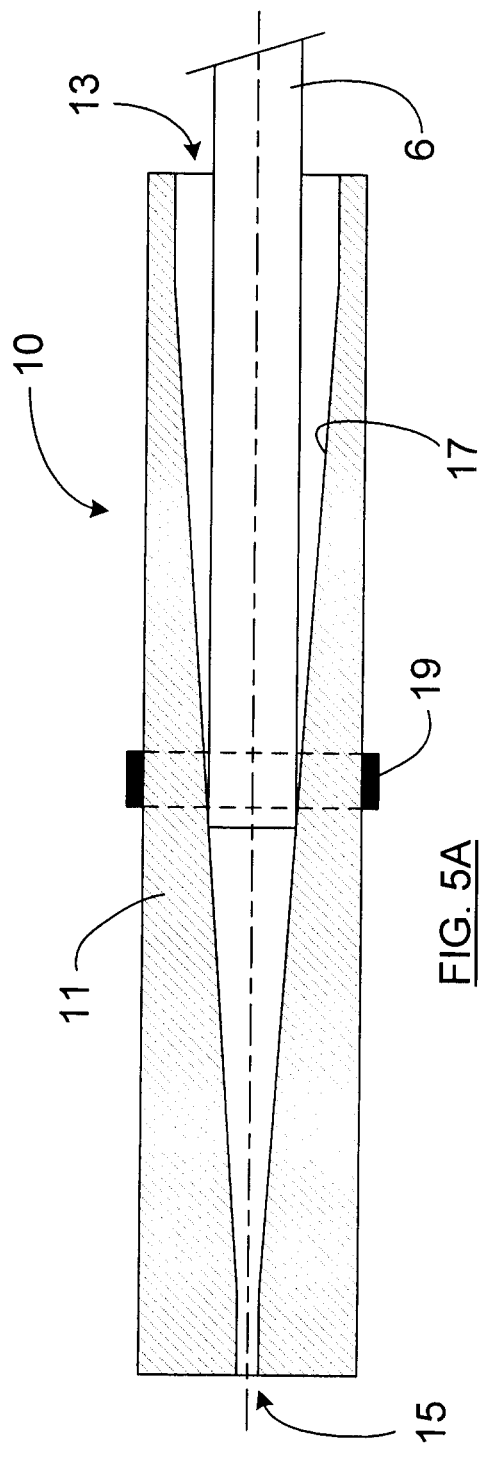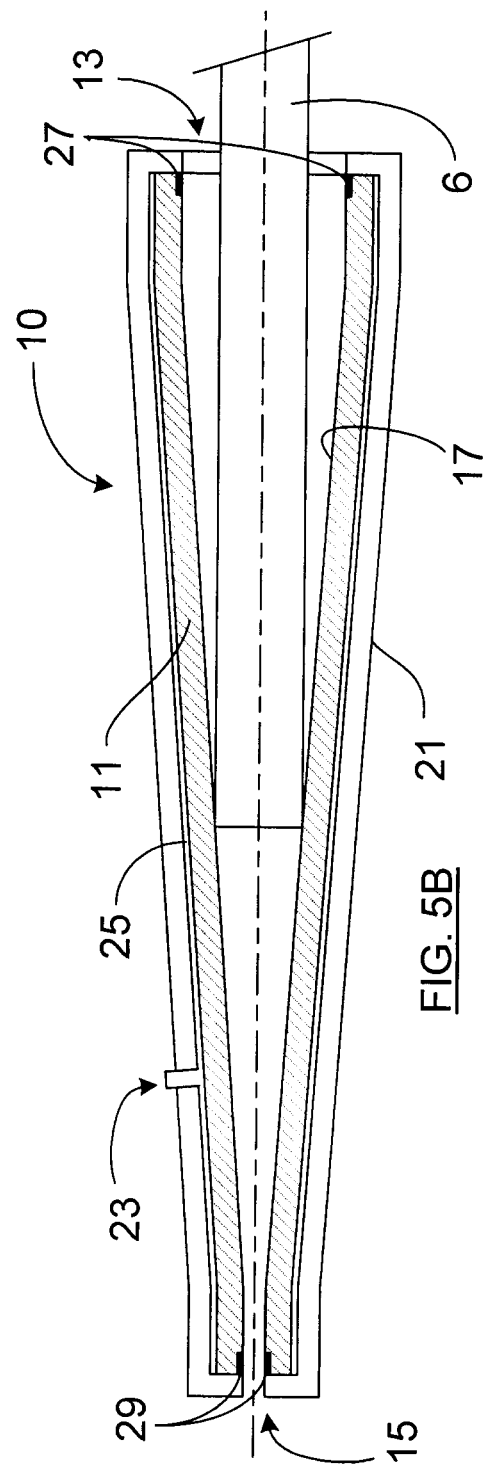

METHOD FOR TESTING A MECHANICAL INTEGRITY OF AN INSULATING LAYER COVERING A CONDUCTOR IN A CABLE

RELATED APPLICATIONS

This application claims priority to U.S. Provisional App. No. 61/006,018, filed Dec. 14, 2007.

FIELD OF THE INVENTION

The present invention relates to electric or telecommunication cable testing and more particularly to a method for testing a mechanical integrity of an insulating layer covering a conductor in a cable of a type where a longitudinal void is defined inside the insulating layer in a region of the conductor.

BACKGROUND

Low voltage electric cables (e.g. up to 1 kV) such as those used in underground installations are generally made of conductor strands covered by an insulating layer. A puncture in the insulating layer of a cable may happen during the cable installation, during prior manipulations such as when winding the cable around a drum, or even as a result of a manufacturing defect. While the cable is energized, in presence of humidity or water, an electric arc or a partial discharge can occur between the conductor of a damaged cable and the neutral, causing degradation of the insulating layer and an eventual failure condition. It can even lead to an explosive environment if the cable is installed in a duct and an explosive gas is produced as a result of the insulation decomposition. This phenomenon is discussed in the article "Manhole Explosions Due to Arcing Faults on Underground Secondary Distribution Cables in Ducts", Bohdan, K. et al., IEEE Transactions on Power Delivery, Vol. 7, No. 3, July 1992, p. 1425-1433, and in the article "Intermittent Arcing Fault on Underground Low-Voltage Cables", Hamel, A. and al., IEEE Transactions on Power Delivery, Vol. 19, No. 4, October 2004, pp. 1862-1868.

There is thus a need for testing the integrity of the insulating layer of a cable, whether it is a new cable received around a drum, a cable just installed, or an old cable in service, and in particular in the case of an underground electric cable.

As discussed in U.S. Pat. No. 6,600,423 (Rozier et al.), telecommunication companies use air pressure pumped into their cables and pipes to create positive pressure in the cables, enabling them to resist standing water, moisture damage and the like.

U.S. Pat. No. 5,596,138 (Onodera et al.) discusses pressure testing an electrical housing such as that of an electric plug for air tightness.

U.S. Pat. No. 5,238,172 (Le Davay) discusses sealing integrity testing of a metal tube that encases an electrical and/or optical fiber cable embedded in a sealing material filling the tube. The testing relies upon priming the sealing material injected into the tube with a detectable test gas.

The above techniques do not address the problem of testing the integrity of an insulating layer around a cable having a longitudinal void such as formed, for example, by the interstitial space along a conductor strand or the like, in order to detect damage such as caused by a puncture and to avoid cable failure and potential safety hazards.

For a cable in a dry pipe, a dielectric test would not detect a small insulation defect.

Self sealing cable technology that contains a migrating fluid in the entire cable with the fluid being inside the insulation layers is also known. However, the self sealing technology is required to be used throughout the whole length of the cable to provide effective repair protection, whether the cable has been damaged or not, which is not an economical solution.

SUMMARY

An object of the invention is to provide a method for testing a mechanical integrity of an insulating layer covering a conductor in an electrical or telecommunication cable of a type where a longitudinal void is present inside the insulating layer in a region of the conductor, to detect damages such as caused by a puncture.

According to one aspect of the present invention, there is provided a method for testing integrity of an insulating layer covering a conductor in a cable, a longitudinal void being defined inside the insulating layer in a region of the conductor, comprising the steps of:

blocking a first end of the insulating layer;

injecting a compressed gas at a second end of the insulating layer so that the gas enters and travels the longitudinal void inside the insulating layer towards the first end thereof;

measuring a gas pressure inside the insulating layer at least near the second end thereof;

stopping injection of the compressed gas after a predetermined injection time period;

monitoring a variation of the gas pressure inside the insulating layer during a diagnostic time window succeeding to a transitional time period following the stopping of the injection; and determining integrity of the insulating layer based on the variation of the gas pressure during the diagnostic time window.

BRIEF DESCRIPTION OF THE DRAWINGS

A detailed description of preferred embodiments will be given herein below with reference to the following drawings, in which like numbers refer to like elements:

FIGS. 2A and 2B are a graph showing stages of a second embodiment of the testing method and a corresponding arrangement for implementing the testing method.

FIGS. 3A and 3B are a graph showing stages of a third embodiment of the testing method and a corresponding arrangement for implementing the testing method.

FIGS. 5A and 5B are cross-section views of cable end connectors with mechanical and pneumatic tightening arrangements.

DETAILED DESCRIPTION OF THE PREFERRED EMBODIMENTS

The method according to the invention is for testing the mechanical integrity of an insulating layer covering a conductor in a cable of a type where a longitudinal void is defined inside the insulating layer in a region of the conductor. The method can be used to verify the mechanical integrity of isolated cables, especially of underground low voltage cables, and involves the injection of a compressed gas in a cable core. In the present disclosure, the term "cable" generally refers to a bound or sheathed group of mutually insulated conductors, but it may also refer to a single insulated conductor. In the present disclosure, the term "conductor" refers to a phase, a neutral, or any other cable core arrangement capable of conducting electricity, light or other form of energy. In the present disclosure, the term "puncture" refers to various forms and shapes of openings in the insulating layers, for example a needle hole, a slot, etc. The method is directed to detection of punctures in the insulation of a cable conductor in order to avoid eventual arcing defects through low voltage cables installed in ducts or supported by cable racks or buried directly in the soil. The method is intended to be rapid, implementable at low cost, and applicable to a new or existing cable installation. The integrity verification may be achieved simultaneously on several cable conductors, phases and neutral, and for various cable gauges (sizes) and types (not necessarily low voltage cables).

Figure 4:
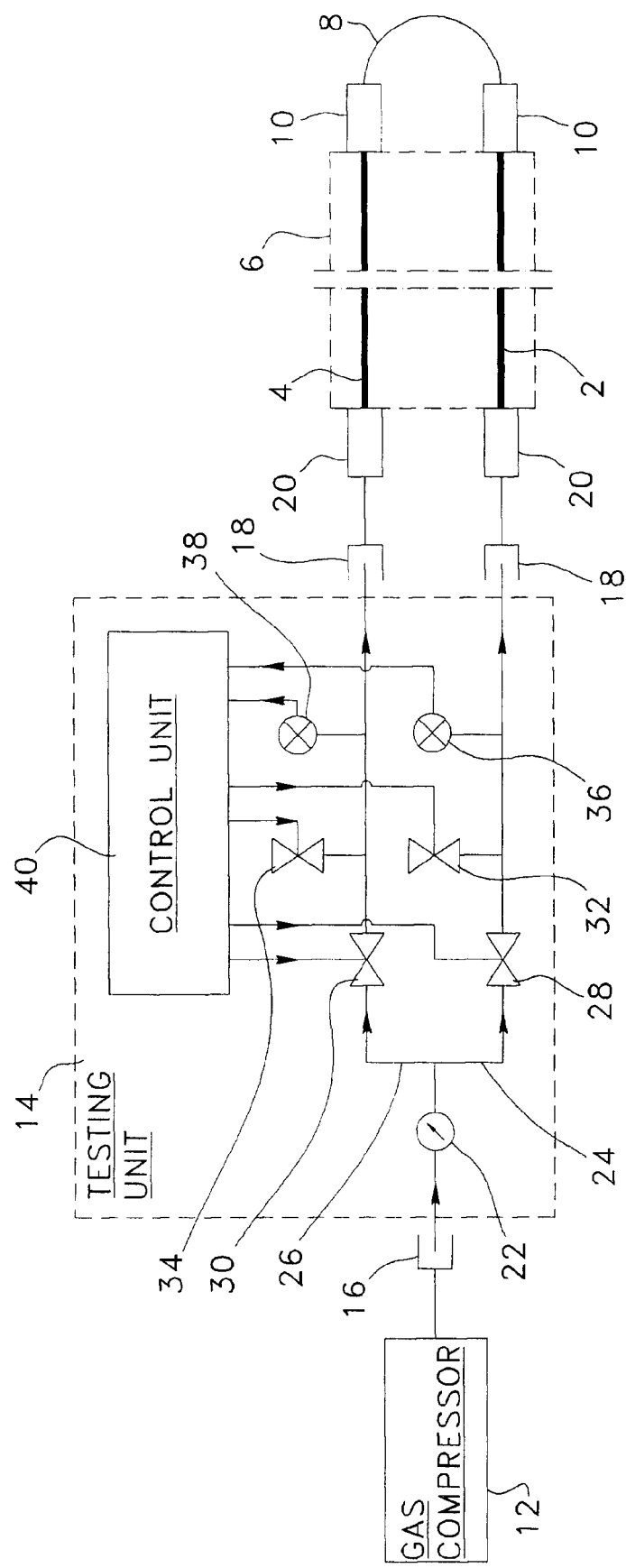
FIG. 4 is a schematic diagram illustrating a general arrangement for implementing the testing method.

Referring to FIG. 4, there is shown a general testing arrangement for implementing the testing method according to the invention. In the illustrated case, the testing method is used to simultaneously test two insulated conductors 2, 4 of a multiphase cable 6 (shown in staple lines). To this effect, the insulating layers of the conductors 2, 4 have ends coupled together to form a loop into which the compressed gas will be injected. The coupling can be achieved using a coupling tube 8 attached hermetically to the ends of the insulating layers with end connectors 10 to form a passage between the longitudinal voids defined inside the insulating layers in a region of the conductors 2, 4. This coupling arrangement of adjacent ends of the insulating layers allows the testing method to be carried out on a single side of the cable 6. However, the method may be used to test a single conductor 2, 4 of the cable 6 if desired. The method may also be used to test simultaneously more than two conductors 2, 4. In such a case, the insulating layers of the conductors 2, 4 simply need to be coupled together either on a same side of the cable 6, for example using a manifold (not shown), or on both sides of the cable 6 to couple the insulating layers of the conductors 2, 4 in series.

The illustrated testing arrangement further has a gas compressor 12 (or other source of compressed gas), a testing unit 14, and connectors 16, 18 for coupling the testing unit 14 to the compressor 12 and to connecting tubes 20 attached to ends of the insulating layers of the conductors 2, 4. The testing unit 14 may be provided with a pressure reducer 22, gas lines 24, 26, supply valves 28, 30, draining valves 32, 34, gas pressure gauges 36, 38, and a control unit 40 connected to the valves 28, 30, 32, 34 and the pressure gauges 36, 38 for controlling operation of the valves 28, 30, 32, 34 and reading the pressures from the pressure gauges 36, 38. The pressure gauges 36, 38 may take the form of pressure sensors or meters or any appropriate pressure measuring instruments or devices. The compressed gas to be injected in the longitudinal void(s) may be simply air. But other types of gas may be used if desired, provided that it will not react with the materials of the cable and those used in the testing unit 14. For example, helium may be used for its reduced molecular size. The gas or air needs not be dehumidified, but can be if desired. Non-dehumidified air may simplify the equipment and may contribute to reduce the cost of the verification. The compressor 12 may be equipped with a gas tank for easy replacement. The testing unit 14 may be arranged to be battery powered and/or connectable to a power source such as an electrical outlet.

The control unit 40 is preferably arranged to provide for a completely automatic operation of the testing unit 14, the main functions being the control of the gas injection duration and pressure, the processing of the measurements for diagnostic and integrity determination of the insulating layer, the recording of test data and drainage of the injected gas at the end of a test.

Referring to FIGS. 5A and 5B, the end connectors 10 may be conveniently formed of a sleeve 11 having opposite larger and smaller openings 13, 15 with respect to each other and between which a conical or an otherwise diameter varying inner surface 17 extends, so as to accommodate different types of cables 6 having different diameter sizes. The sleeve 11 may be made of any suitable material, preferably an elastic material such as natural or synthetic rubber, reinforced or not, for better sealing between the inner surface 17 and the end of the cable 6 inserted through the larger opening 13 of the sleeve 11. The smaller opening 15 of the sleeve 11 allows passage of the compressed gas to be injected into the cable 6. Tightening of the sleeve 11 around the cable 6 can be achieved in various ways. Referring to FIG. 5A, a simple clamp 19 like a hose clamp movable to an appropriate position along the sleeve 11 to compress the sleeve 11 against the cable 6 can be used for this purpose. Referring to FIG. 5B, the tightening can be achieved using a pneumatic arrangement for applying pressure around the sleeve 11 provided that it is made of an elastic material. The pneumatic arrangement has an enclosure 21 surrounding the sleeve 11 and provided with a port 23 for pressurizing a gas in a chamber 25 between the sleeve 11 and the enclosure 21, at a pressure level exceeding that of the compressed gas injected in the tested cable 6. Gaskets 27, 29 mounted at ends of the sleeve 11 may be provided to ensure that the chamber 25 formed between the enclosure 21 and the sleeve 11 is hermetic. Other suitable tightening arrangements can also be used if desired.

Figure 1A:
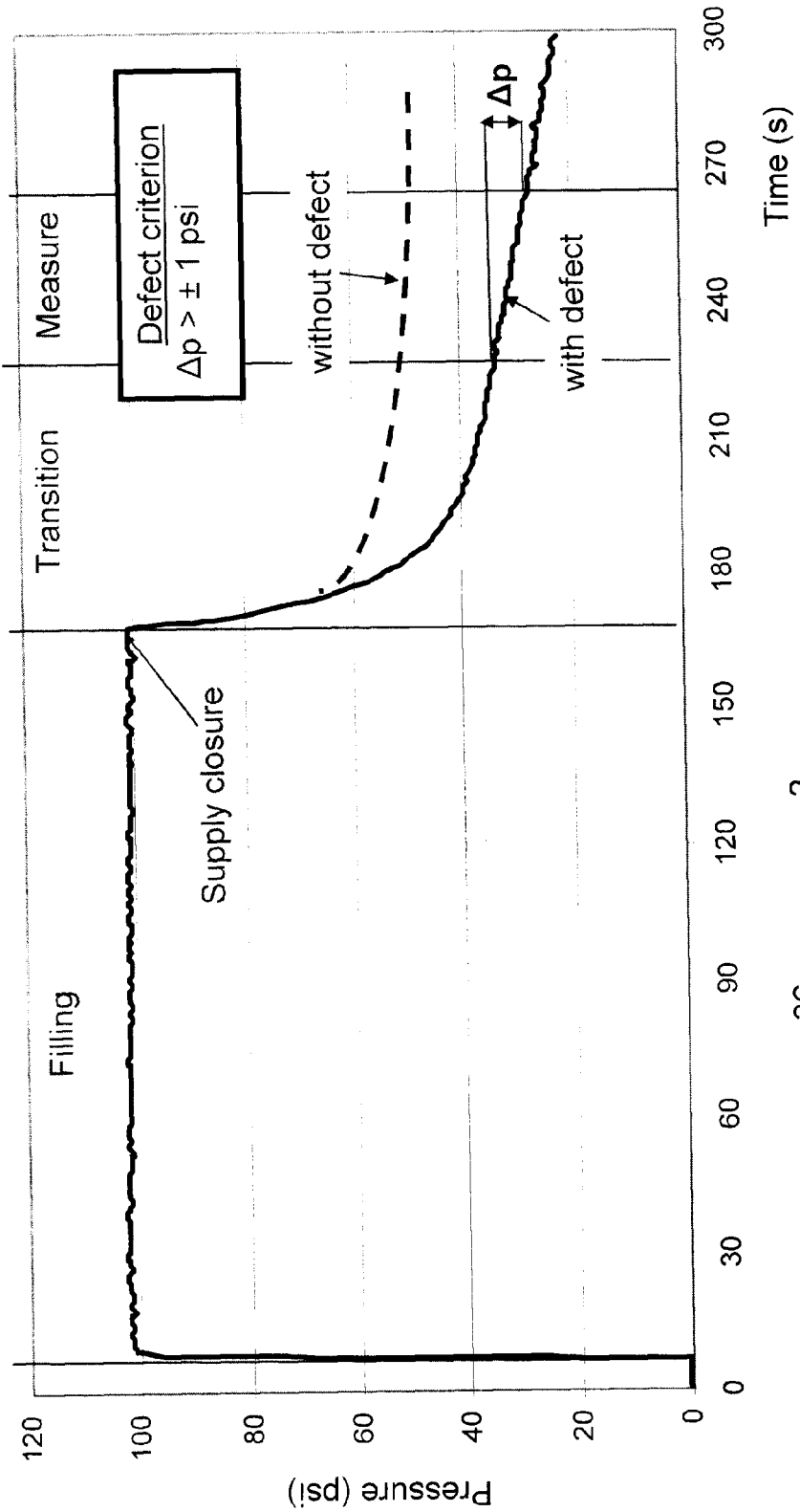
FIGS. 1A and 1B are a graph showing stages of a first embodiment of the testing method and a corresponding arrangement for implementing the testing method.
Figure 1B:
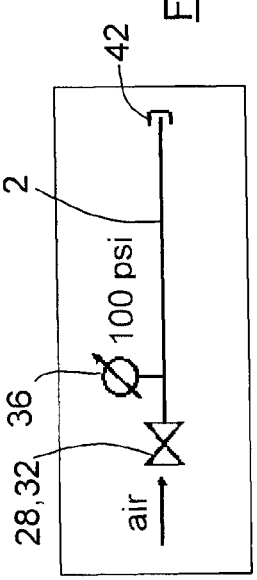

Referring to FIG. 1B, a first embodiment of the testing method involves initially blocking a first end of the insulating layer, for example with a cap 42, and then injecting a compressed gas at a second end of the insulating layer so that the gas enters and travels the longitudinal void inside the insulating layer towards the first end of the insulating layer. For the testing of a low voltage underground cable, the pressure may be in a range of 25 to 125 psi, and preferably between 50 to 75 psi. The pressure may possibly be more or less depending on the type of cable, e.g. lower than 50 psi for telecommunication cables. In the illustrated case, a pressure of 100 psi is used. A gas pressure inside the insulating layer is measured e.g. through the pressure gauge 36 near the second end of the insulating layer. Injection of the compressed gas is stopped after a predetermined injection time period. A variation of the gas pressure inside the insulating layer is then monitored during a diagnostic time window succeeding to a transitional time period following the stopping of the injection. Integrity of the insulating layer is determined based on the variation of the gas pressure during the diagnostic time window.

Referring to FIG. 1A, there is shown a graph of the pressure inside the insulating layer as a function of time during the stages corresponding to the first embodiment of the method, in the example case of a 3/0 electrical cable (1000 V) of 60 m length having a hole of 1 mm in diameter. The stages comprise an initial filling stage from the compressed gas injection until the injection is stopped, a transition stage following the stopping of the injection, and a measure stage in the diagnostic time window succeeding to the transition stage. In the filling stage, the pressure initially rises around 100 psi at the second end and remains around this pressure level until the compressed gas injection is stopped. The pressure normally exhibits a steep drop immediately after the stopping of the injection. Depending on whether the cable shows a defect or not, the pressure drop decreases more or less slowly during the transition stage. The reduction of pressure Δp becomes significant in the measure stage (lower curve) in the event where the cable insulation is punctured. Otherwise, the variation of pressure Δp becomes almost insignificant, e.g. below 1 psi (upper curve). As a result, a defect criterion can be based on whether the variation of pressure monitored during the diagnostic time window exceeds approximately 1 psi or another threshold pressure variation indicative of a puncture in the insulating layer, for example 2 to 3 psi in order to be more permissive with respect to the airtight level of the coupling elements used in the testing arrangement.

The variation of pressure during the transition stage is not considered as there is some kind of pressure wave traveling along the cable 2 during this stage. Once the integrity diagnostic is made, the cable 6 may be depressurized, e.g. using the release valve 32. The duration of the test depends upon the cable size and length. Typically, for low voltage electrical cables, the injection time period is less than 120 s, the transitional time period is less than 120 s, and the diagnostic time window has a time length less than 60 s. Thus, an integrity diagnostic may be made approximately in less than 5 minutes for the majority of low voltage cables of the underground network.

Referring to FIG. 2B, a second embodiment of the testing method involves using a second pressure gauge 38 near the first end of the cable. A valve arrangement such as formed of the valves 30, 34 (see also FIG. 4) may be used instead of the cap 42 (shown in FIG. 1B) if desired. In the illustrated case, two conductors 2, 4 are coupled in series e.g. using a coupling tube 8 to form a loop allowing to test both conductors 2, 4 of the cable simultaneously. However, it should be understood that the method can be implemented on a single conductor or more than two conductors if desired. In practice, for an electrical cable, the phase conductors will all be coupled in parallel and connected with the neutral to form a testing loop. Such a configuration is advantageous in that both ends of the testing loop are adjacent, which simplifies the installation of the control and measuring elements of the testing equipment.

The second embodiment of the testing method varies from the first embodiment in that the pressure $p_1$ in the insulating layer(s) is also measured at the first end. This pressure is used to measure a travel time (referred to as cT in FIGS. 2A and 3A) taken by the compressed gas injected at the second end to reach the first end of the insulating layer during the initial injection of the compressed gas inside the insulating layer until the gas pressure at the first end begins to rise, e.g. above 3 psi (or another threshold pressure value if desired, typically from 1 to 5 psi). The travel time cT is indicative of a "pneumatic impedance" of the conductors 2, 4, i.e. a resistance opposite to the flow of the injected gas. This parameter may advantageously be used as an indicator of the integrity of the insulating layer if, for example, it exceeds a predetermined threshold time length. It may also advantageously be used to set the duration of the transitional time period and of the diagnostic time window, and possibly also the injection time period. For example, the injection time period may be set to elapse as a result of whatever happens first between a predetermined time limit being reached and the gas pressure measured near the first end reaching a target pressure level with respect to the gas pressure $p_2$ of the compressed gas injected near the second end. In the illustrated case, the target pressure level to be reached at the first end is 50 psi, while the pressure of the compressed gas injected is 100 psi. The target pressure level may have a value in a pressure range near half the pressure of the injected gas, e.g. in a range from 30 psi to 70 psi, and preferably near 50 psi for injected gas having a pressure of 100 psi as in the present example. The lower the target pressure level is set, the faster the test is.

Referring to FIG. 2A, there is shown a graph of the pressure inside the insulating layer(s) as a function of time during the stages corresponding to the second embodiment of the method, in the example case of a 3/0 electrical cable (1000 V) of 230 m length having a needle puncture of less than 0.5 mm in diameter. The filling stage is divided in two parts, a first one being used to determine the pneumatic impedance cT of the cable, and a second one lasting until the pressured measured at the first end reaches the target pressure level of 50 psi. It has been observed that the second part of the stage may last from one to two times the cT parameter measured in the first part of the stage. It has also been observed that a time period of the transition stage set to approximately 1.5 times the cT parameter is enough, while a measure stage having a diagnostic time window approximately corresponding to the cT parameter provides the desired results in most if not all the cases. The variation of the gas pressure monitored may be, in that embodiment, the sum of the pressures $p_1+p_2$ at both cable ends as a function of time.

In the second embodiment, multiple defect criteria may be used. Integrity may be determined by verifying whether the variation of the sum of the gas pressures exceeds a threshold pressure variation indicative of a defect in the insulating layer, e.g. approximately 1 psi in the illustrated case (typically from 1 psi to 3 psi). Integrity may also be determined by verifying whether the pneumatic impedance cT (travel time) exceeds a threshold time length indicative of a defect in the insulating layer, e.g. 180 s. in the present case, verifying whether the injection time period for reaching the target pressure level at the first end exceeds a threshold time length indicative of a gas leak, e.g. 3 cT in the illustrated case (typically between 3 cT and 5 cT), and verifying whether the gas pressure at the first end remains below the target pressure level during the injection time period (thus never reaching the target pressure level).

The graph also shows that when the injection is stopped, the pressure measured at the first end may still continue to rise for a moment due to the pressure wave travelling in the longitudinal void.

The second embodiment of the testing method can advantageously be used to automatically adapt the duration of the test to the characteristic pneumatic impedance of the cable and to avoid extending needlessly the duration of the test and this without having to know the parameters controlling its impedance such as its diameter, its length, the strand density, etc.

Referring to FIG. 3B, a third embodiment of the testing method involves injecting a compressed gas also at the first end of the insulating layer, but after a delay with respect to the initial injection of the compressed gas at the second end. This delay corresponds approximately to the measured travel time or pneumatic impedance cT. After the injection time period, the injection at the first end is then stopped at the same time as the injection of the compressed gas at the second end. Thus, this embodiment uses the injection of compressed gas at both ends of the cable, with the advantageous result that the testing time is substantially reduced compared to the first and second embodiments of the testing method.

Referring to FIG. 3A, there is shown a graph of the pressures inside the insulating layer(s) as a function of time during the stages corresponding to the third embodiment of the method, in the same example case of a cable as for the graph of FIG. 2A. Like in the second embodiment, the filling stage is divided in two parts. At the beginning, compressed gas is injected only at one cable end, the other end being blocked.

This allows measuring the pneumatic impedance cT. After that, compressed gas is injected at both cable ends during a time period approximately corresponding to half the parameter cT (or during a longer time period if desired, e.g. 0.75 to 1 cT), and then all injection is stopped.

After the transition period set to approximately 1 times the cT parameter, the pressure variation using the sum of the pressures $p_1+p_2$ measured at both ends is monitored to determine the mechanical integrity of the insulating layer(s). A pressure variation exceeding a threshold level, e.g. 1 psi during the diagnostic time window equal to 1 times the cT parameter, and a pneumatic impedance exceeding a predetermined time length, e.g. 180 s., may be used as defect criteria. For detecting large leaks, an additional criterion that $p_1+p_2<100$ psi may also be used.

The disclosed testing method is based on the unexpected yet successful use of the longitudinal void formed for example by the interstitial space between and along the fibers of a strand of fibers forming a cable conductor. Thus, the testing method is applicable to a large variety of existing cable designs and does not require designing and using cables having a specific longitudinal passage for the compressed gas injection and the gas pressure measurements. The fibers may be for example electrically conductive fibers, optical fibers, and the cables may be low or medium voltage electric cables, telecommunication cables with or without optical fibers, or other types of cables with other types of fibers provided that they exhibit longitudinal voids in regions of the insulated conductors. Punctures as small as 0.5 mm in diameter can be detected with the disclosed testing method. A temperature difference between a cable and injected air, as well as air humidity under normal conditions, have no effects on the integrity diagnostic within a temperature range of +40° C. to −20° C. The testing method is particularly advantageous in that it involves pressurizing the metal (or other conductive material) conductor contained in a polymer (or other insulating material) insulating layer and only applying a remediation on the damage cables for better economics compared, for example, to the self sealing cable design. The testing method may in particular be used to test the integrity of the polymer layer for damage after a cable has been installed to identify that repair is needed to prevent electrical arcing damage from occurring.

The test method illustrated by FIGS. 1, 2 and 3 allows detecting practically all insulation leaks in low voltage electrical cables having a length of up to a few hundred meters, which represents virtually all low voltage electrical cables used in the industry.

During the test procedure, the periodic pressure measurements inside the insulating layer may be filtered to reduce the perturbations that may be due to the sensitivity limits of the measuring components. For example, pressure measurements may be taken every 0.1 s. and the average of ten measurements over a second may be kept for defect criteria. Other filtering techniques may be used, e.g. smoothing, etc., if desired. With an increased precision, the discrimination limit of the pressure loss separating the case of an airtight cable from that of a leaking cable is reduced. Smaller sized punctures in the insulating layer may then be detected and a shorter diagnostic time window may be used.

In the event that a leak is detected with the testing method, then a repair operation may be achieved by injection of a fluid such as a silicone-based fluid in the cable, so that the fluid flows into the insulation's punctured region. The fluid then fills the gap to prevent electrical arcing. The fluid should preferably solidify or not flow when the pressure is removed and may possibly crosslink in the puncture.

The typical values given hereinabove should not be considered as defining strict limits, but rather as simply providing an indication of exemplary values which may otherwise be different in other testing situations and environments.

The foregoing description has been presented to enable a person skilled in the art to make and use the invention, and has been provided in the context of particular applications and their requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The invention claimed is:

1. A method for testing a mechanical integrity of an insulating layer covering a conductor in a cable, a longitudinal void being defined inside the insulating layer in a region of the conductor, comprising the steps of:

blocking a first end of the insulating layer;

injecting a compressed gas at a second end of the insulating layer remote from the first end thereof so that the gas enters and travels the longitudinal void inside the insulating layer towards the first end thereof;

measuring a gas pressure inside the insulating layer at least near the second end thereof;

stopping injection of the compressed gas after a predetermined injection time period;

monitoring a variation of the gas pressure inside the insulating layer during a diagnostic time window succeeding to a transitional time period following the stopping of the injection and during which a pressure wave travels along the longitudinal void;

measuring a travel time of the pressure wave to reach the first end of the insulating layer from an initial injection of the compressed gas at the second end of the insulating layer;

determining a pneumatic impedance of the cable based on the travel time; and determining integrity of the insulating layer based on the variation of the gas pressure during the diagnostic time window and the pneumatic impedance.

2. The method according to claim 1, further comprising the steps of:

measuring the gas pressure inside the insulating layer also near the first end thereof.

3. The method according to claim 2, further comprising the step of:

setting the injection time period as a function of the travel time.

4. The method according to claim 2, further comprising the step of:

setting the transitional time period and the diagnostic time window as functions of the travel time.

5. The method according to claim 2, further comprising the step of:

setting the injection time period to elapse as a result of the first to occur of (a) a predetermined time limit being reached and (b) the gas pressure measured near the first end of the insulating layer reaching a target pressure level with respect to a gas pressure of the compressed gas injected near the second end of the insulating layer.

6. The method according to claim 5, wherein the target pressure level has a value in a pressure range half the pressure of the compressed gas injected near the second end of the insulating layer.

7. The method according to claim 2, wherein the step of monitoring comprises measuring the variation using a sum of the gas pressures measured near the first and second ends of the insulating layer.

8. The method according to claim 2, further comprising the steps of:
   injecting a compressed gas also at the first end of the insulating layer after a delay with respect to the initial injection of the compressed gas at the second end of the insulating layer that corresponds to the travel time; and
   stopping injection of the compressed gas at the first end of the insulating layer at a same time as the injection of the compressed gas at the second end is stopped.

9. The method according to claim 1, wherein the compressed gas comprises air.

10. The method according to claim 1, further comprising the step of dehumidifying the gas injected inside the insulating layer.

11. The method according to claim 1, wherein the cable comprises multiple like conductors covered by respective insulating layers, the method further comprising the step of coupling ends of the insulating layers together to form a loop into which the compressed gas is injected.

12. The method according to claim 1, wherein the conductor comprises a strand of fibers, the longitudinal void inside the insulating layer being formed by an interstitial space between and along the fibers.

13. The method according to claim 12, wherein the fibers comprise electrically conductive fibers.

14. The method according to claim 12, wherein the fibers comprise telecommunication fibers.

15. The method according to claim 1, wherein the step of determining integrity comprises verifying whether the variation of the gas pressure exceeds a threshold pressure variation value indicative of a defect in the insulating layer.

16. The method according to claim 2, wherein the step of determining integrity comprises verifying whether the variation of the gas pressure exceeds a threshold pressure variation value indicative of a defect in the insulating layer, and at least one of verifying whether the travel time exceeds a threshold time length indicative of a defect in the insulating cable, verifying whether the injection time period for reaching a target pressure level at the first end of the insulating layer exceeds a threshold time length indicative of a defect in the insulating layer, and verifying whether the gas pressure at the first end of the insulating layer remains below a target pressure level during the injection time period.

17. The method according to claim 1, wherein the compressed gas injected inside the insulating layer has a gas pressure between 50 to 125 psi, the injection time period is less than 120 seconds, the transitional time period is less than 120 seconds, and the diagnostic time window has a time length less than 60 seconds.

18. The method according to claim 2, wherein the compressed gas injected inside the insulating layer has a gas pressure between 50 to 125 psi, the injection time period substantially corresponds to 1 to 2 times the travel time, the transitional time period substantially corresponds to 1.5 times the travel time, and the diagnostic time window has a time length substantially corresponding to the travel time.

* * * * *